(12) United States Patent
Huang et al.

(10) Patent No.: US 11,353,340 B2
(45) Date of Patent: Jun. 7, 2022

(54) MOTOR ROTATION ANGLE MEASUREMENT DEVICE AND METHOD

(71) Applicant: XINJIANG GOLDWIND SCIENCE & TECHNOLOGY CO., LTD., Xinjiang (CN)

(72) Inventors: Bo Huang, Beijing (CN); Jiangming Huo, Beijing (CN)

(73) Assignee: XINJIANG GOLDWIND SCIENCE & TECHNOLOGY CO., LTD., Xinjiang (CN)

( * ) Notice: Subject to any disclaimer, the term of this patent is extended or adjusted under 35 U.S.C. 154(b) by 599 days.

(21) Appl. No.: 16/332,669

(22) PCT Filed: Jun. 6, 2018

(86) PCT No.: PCT/CN2018/090078
§ 371 (c)(1),
(2) Date: Mar. 12, 2019

(87) PCT Pub. No.: WO2018/228250
PCT Pub. Date: Dec. 20, 2018

(65) Prior Publication Data
US 2021/0333130 A1    Oct. 28, 2021

(30) Foreign Application Priority Data
Jun. 15, 2017  (CN) .......................... 201710451637.6

(51) Int. Cl.
*G01D 5/248* (2006.01)
*H02P 6/185* (2016.01)
(Continued)

(52) U.S. Cl.
CPC ............... *G01D 5/248* (2013.01); *G01B 7/30* (2013.01); *H02P 6/185* (2013.01); *H02P 6/188* (2013.01); *H02P 2203/03* (2013.01)

(58) Field of Classification Search
CPC ......... G01D 5/248; H02P 6/188; H02P 6/185; H02P 2203/03; G01B 7/30
See application file for complete search history.

(56) References Cited

U.S. PATENT DOCUMENTS 6,834,256 B2 * 12/2004 House ..................... H02P 29/02
                                                    318/565
6,993,439 B2 *  1/2006 Grosjean ............. G01M 13/028
                                                    324/76.12
(Continued)

FOREIGN PATENT DOCUMENTS

CN         1767306 A    5/2006
CN       102342016 A    2/2012
(Continued)

OTHER PUBLICATIONS

Extended European Search Report dated Oct. 17, 2019; Appln. No. 18817858.6.
(Continued)

*Primary Examiner* — Christopher P McAndrew
*Assistant Examiner* — Zannatul Ferdous

(57) ABSTRACT

Provided are a motor rotation angle measurement device and method. The device may comprise: a signal conditioning circuit, configured to receive a three-phase output voltage of a motor and separately generate three square-wave signals; and a processor, configured to generate a six-multiplying frequency pulse whenever jumping of any one of the three square-wave signals, is detected in a rotation period of a motor, generate compensation pulses between the current six-multiplying frequency pulse and a next six-multiplying frequency pulse based on a time interval between the current six-multiplying frequency pulse and a previous six-multiplying frequency pulse and a preset compensation subdivision coefficient k, and accumulate the number of the com- (Continued)

pensation pulses, wherein the number of the compensation pulses is related to the rotation angle of the motor.

19 Claims, 8 Drawing Sheets

(51) Int. Cl.
    *G01B 7/30*     (2006.01)
    *H02P 6/18*     (2016.01)

(56) References Cited

U.S. PATENT DOCUMENTS

| | | | |
|---|---|---|---|
| 2010/0019135 A1 | 1/2010 | Eckert et al. | |
| 2010/0250184 A1 | 9/2010 | Kawamura et al. | |
| 2012/0059642 A1 | 3/2012 | Vollmer et al. | |
| 2013/0275079 A1* | 10/2013 | Cousineau | G01P 3/481 702/145 |
| 2017/0003348 A1* | 1/2017 | Fedigan | G01R 31/343 |

FOREIGN PATENT DOCUMENTS

| | | | |
|---|---|---|---|
| CN | 102778580 A | * | 11/2012 |
| CN | 102778580 A | | 11/2012 |
| CN | 202713106 U | | 1/2013 |
| CN | 102938628 A | | 2/2013 |
| CN | 102981014 A | | 3/2013 |
| CN | 105359404 A | | 2/2016 |
| CN | 105720869 A | | 6/2016 |
| CN | 105846734 A | | 8/2016 |
| CN | 107101607 A | | 8/2017 |
| DE | 69409217 T2 | | 7/1998 |
| JP | 58182559 | | 10/1983 |

OTHER PUBLICATIONS

International Search Report dated Aug. 15, 2018; PCT/CN2018/090078.

* cited by examiner

MOTOR ROTATION ANGLE MEASUREMENT DEVICE AND METHOD

CROSS REFERENCE TO RELATED APPLICATIONS

This application is a national phase of international Application Na, PCT/CN2018/090078, titled "ELECTRIC MACHINE ROTATION ANGLE MEASUREMENT DEVICE AND METHOD", filed on Jun. 6, 2018, which claims priority to Chinese Patent Application No. 201710451637.6 titled "ELECTRIC MACHINE ROTATION ANGLE MEASUREMENT DEVICE AND METHOD" and filed with the Chinese State Intellectual Property Office on Jun. 15, 2017, both of which are incorporated herein by reference in their entirety.

FIELD

The present disclosure relates to an electric machine rotation angle measurement device and method, and in particular to a non-contact type device and method capable of accurately measuring the electric machine rotation angle.

BACKGROUND

Currently, it is necessary to measure the rotation angle of the synchronous electric machine (generator and motor), in many engineering fields, to make a better observation about the modal state during the operation of the synchronous electric machine, control the operation process and the state of the electric machine, improve the efficiency of the electric machine unit, and prolong the life of the electric machine unit.

The method for measuring the rotation angle of the synchronous electric machine is categorized into: contact type and non-contact type.

The contact type method for measuring the rotation angle of the synchronous electric machine mainly includes: transferring the rotation of the electric machine to the measurement device via various mechanisms or structures (for example, a spindle coupling), to measure the rotation angle of the electric machine and acquire a current rotated angle of the electric machine relatives to a zero degree reference point. The rotation angle measurement device used in the method includes absolute position type photoelectric rotary encoders, resolvers, and potentiometers.

The contact type measurement method not only increases the measurement cost of the synchronous electric machine rotation angle, but also reduces the reliability of the system, which brings various inconvenience to the installation and maintenance.

There are two main non-contact type methods for measuring the rotation angle of the synchronous electric machine.

The first method involves using a magnetic rotation angle sensor to perform the measuring. A magnet may be installed on the rotation component, and the rotated angle of the magnet may be sensed using a special Hall sensing chip, thereby measuring the rotation angle of the synchronous electric machine. However, a stronger electromagnetic interference may be generated during the operation of the synchronous electric machine, which may affect the Hall sensing chip, and result in heavy burred measurement data.

The second method involves measuring the rotation angle of the synchronous electric machine, using a proximity switch or a like sensor by installing a tooth profile disc on the rotation component of the electric machine or using multiple mechanical structural feature detection points (such as bolts) on the circumference of the rotation component of the synchronous electric machine. The advantage of the second method is that a special synchronous electric machine rotation measurement device is not required, resulting in lower cost and easier application. But the measurement method has low resolution, the output precision and the update speed of the measurement result are limited to the tooth profile disc or the amount of the feature detection points on the circumference of the rotation component of the synchronous electric machine. At the same time, if the synchronous electric machine runs at a lower speed, the update response speed of the rotation angle measurement result is slow, and the measurement result has a large phase difference.

SUMMARY

In order to solve the problems of low accuracy, poor reliability and high cost occurring in the electric machine rotation angle measurement process as described above, the present disclosure provides an electric machine rotation angle measurement device and method.

The summary of the present disclosure is provided to introduce a selection of concept which will be described in detail in the following detailed description.

An electric machine rotation angle measurement device is provided according to an aspect of the concept for the present disclosure, which includes: a signal conditioning circuit, configured to receive three-phase output voltages UA, UB and UC of the electric machine, and generate a first square wave signal corresponding to UA-UB, a second square wave signal corresponding to UB-UC, and a third square wave signal corresponding to UC-UA respectively; and a processor, configured to generate a six-fold frequency pulse whenever a jump of any square wave signal among the first square wave signal, the second square wave signal, and the third square wave signal is detected during a rotational period of the electric machine, generate compensating pulses between the current six-fold frequency pulse and the next six-fold frequency pulse based on the time interval between the current six-fold frequency pulse and the previous six-fold frequency pulse and the preset compensating subdivision coefficient k, and cumulate the number of the compensating pulses, where the number of the compensating pulses is related to the rotation angle of the electric machine.

An electric machine rotation angle measurement method is provided according to another aspect of the concept for the present disclosure, which includes: generating a six-fold frequency pulse whenever a jump of any square wave signal among the first square wave signal, the second square wave signal, and the third square wave signal is detected during a rotational period of the electric machine, generating compensating pulses between the current six-fold frequency pulse and the next six-fold frequency pulse based on the time interval between the present six-fold frequency pulse and the previous six-fold frequency pulse and the preset compensating subdivision coefficient k, and cumulating the number of the compensating pulses, where the number of the compensating pulses is related to the rotation angle of the electric machine, the first square wave signal corresponds to a difference UA-UB between the UA and UB among three-phase output voltages UA, UB and UC of the electric machine, the second square wave signal corresponds to a difference UB-UC between the UB and UC among three-phase output voltages UA, UB and UC of the electric machine, and the third square wave signal corresponds to a difference UC-UA between the UC and UA among three-phase output voltages UA, UB and UC of the electric machine.

A computer-readable storage medium is provided according to another aspect of the concept for the present disclosure, the computer-readable storage medium stores a program, and the program executes the electric machine rotation angle measurement method above-mentioned.

A computer system is provided according to another aspect of the concept for the present disclosure, the computer system includes a readable storage medium storing a computer program, and the computer program executes the electric machine rotation angle measurement method above-mentioned.

Mechanisms or structures are not required to transfer rotation of the electric machine to the electric machine rotation angle measurement device according to the present disclosure. The jitter and impact generated by the low-speed operation of the electric machine do not affect the measuring effect and the measuring life according to the present disclosure. A special modem is not required by the electric machine rotation angle measurement device, so that the cost may be reduced.

On the other hand, the electromagnetic interference generated by the operation of the electric machine does not affect the electric machine rotation angle measurement device according to the present disclosure, so that it has stronger anti-interfere performance and higher accuracy.

In the present disclosure, the DA (digital to analog converter) may be utilized to calculate the voltage corresponding to the rotation angle of the electric machine, and directly output the voltage corresponding to the rotation angle of the electric machine to the subsequent measurement and control system for the corresponding application of engineering. A special SSI interface and device is not required, which leads to lower cost and fast response speed.

In the present disclosure, the compensating pulses may be generated based on the compensating subdivision coefficient k, and the rotation angle of the electric machine may be calculated based on the number of the compensating pulses, the compensating subdivision coefficient k and the number of pole pairs of the electric machine. The accuracy of the electric machine rotation angle, measured according to the present disclosure, is higher than the measurement accuracy achieved by installing a tooth profile disc on the electric machine or using multiple mechanical structural feature detection points on the circumference of the rotation component of the electric machine. Furthermore, the utility of the compensating pulse may implement the subdivision for the rotation angle of the electric machine, between adjacent six-fold frequency pulses, which reduces the error in the measurement, increase the accuracy and timeliness of the measurement, and no large phase difference exists with real ration angle. Furthermore, when the rotation speed of the electric machine is less than a preset value, the technology scheme of the present disclosure does not generate the compensating pulse, instead, the six-fold frequency pulse is taken as the compensating pulse, which increases the flexibility of the electric machine rotation angle measurement device and saves the resource consumption.

BRIEF DESCRIPTION OF THE DRAWINGS

Embodiments of the present disclosure are described below in detail with reference to the drawings.

Throughout the drawings and the detailed description, the same reference numerals depict the same elements. The drawings may not be shown to scale. And the relative size, proportion and description of the elements in the drawings may be exaggerated for clarity, illustration, and convenience.

DETAILED DESCRIPTION OF THE EMBODIMENTS

The following detailed description is provided to assist the reader in acquiring a comprehensive understanding of the methods, and/or systems described herein. However, various variations, modifications and equivalents to the method and system described herein may be apparent to those skilled in the art. For example, an order of operations described herein is merely exemplary and is not limited to the order described herein. Except those operations occurring in a particular order, any modifications to the order described herein may be apparent after understanding the disclosure of the present application. In addition, the descriptions of well-known features may be omitted for greater clarity and conciseness.

Figure 1:
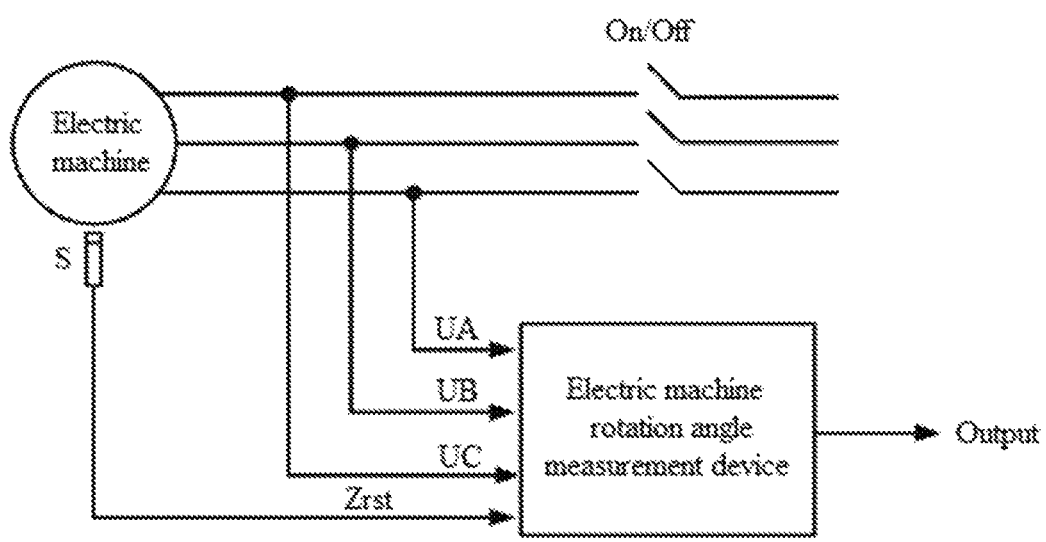
FIG. 1 is a schematic diagram showing a connection of an electric machine rotation angle measurement device according to an exemplary embodiment of the present disclosure.

FIG. 1 is a schematic diagram showing the connection of the electric machine rotation angle measurement device according to an exemplary embodiment of the present disclosure.

Referring to FIG. 1, UA, UB and UC, which are three-phase voltages of the electric machine, are input to the electric machine rotation angle measurement device according to the exemplary embodiment of the present disclosure. In addition, a zero degree reference point (not shown) is provided on the electric machine, which indicates a starting point of a rotation period of the electric machine. When the zero degree reference point comes close to a sensor s provided on the outside of the electric machine rotation angle measurement device, the sensor s generates a zero degree reference point reset signal Zrst. In an exemplary embodiment, the sensor s may be a proximity switch or a sensor with similar functionality to the proximity switch.

According to the exemplary embodiment of the present disclosure, the electric machine rotation angle measurement device may output the rotation angle of the electric machine and/or the voltage corresponding to the rotation angle of the electric machine, based on the voltage signal (namely, the three-phase voltages UA, UB and UC of the electric machine) of a set of windings of the electric machine (for example, a generator or a motor) and the zero degree reference point reset signal Zrst.

Figure 2:
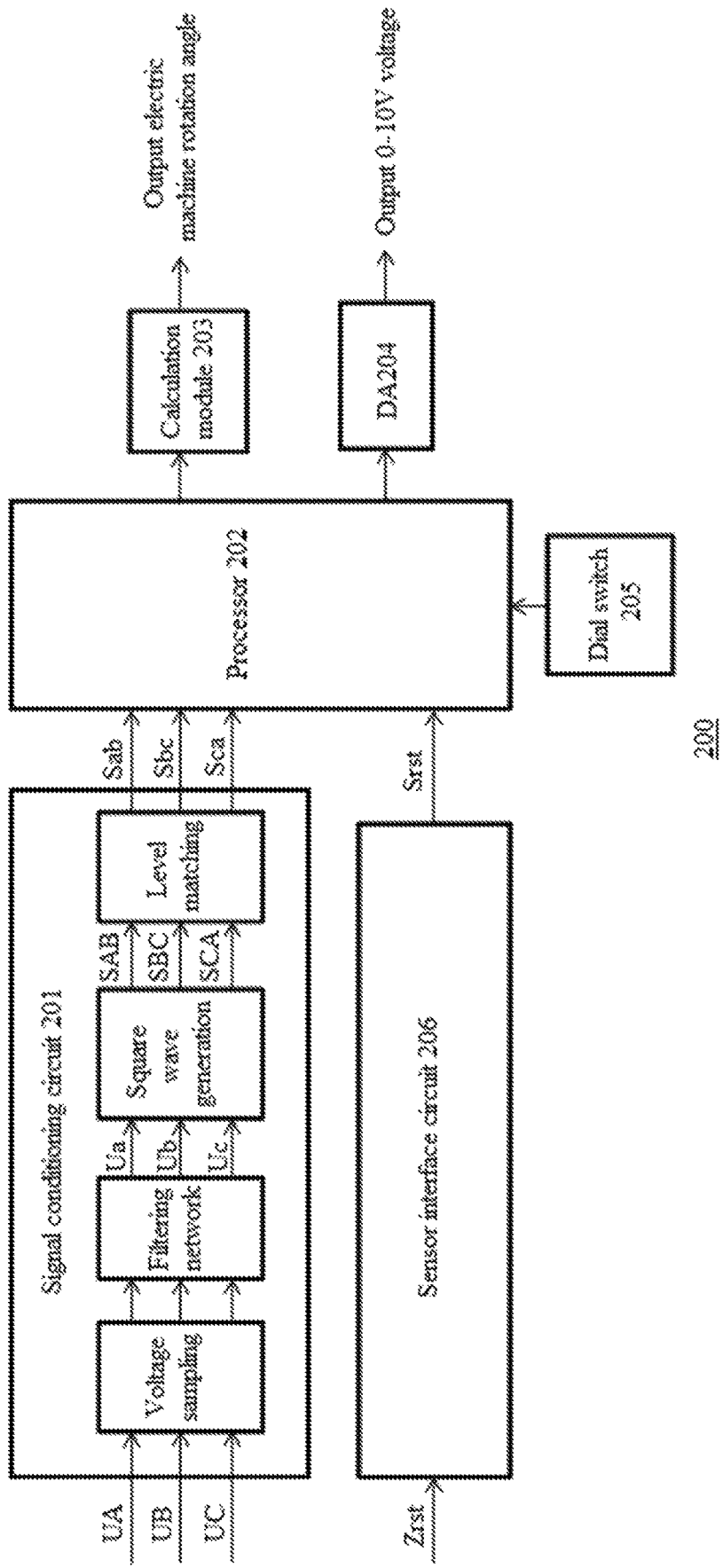
FIG. 2 is a block diagram showing an electric machine rotation angle measurement device according to an exemplary embodiment of the present disclosure.

FIG. 2 is a block diagram showing an electric machine rotation angle measurement device 200 according to an exemplary embodiment of the present disclosure.

Referring to FIG. 2, the electric machine rotation angle measurement device 200 may include a signal conditioning circuit 201, a processor 202, a calculation module 203, a digital to analog converter (DA) 204, a dial switch 205 and a sensor interface circuit 206.

The signal conditioning circuit 201 is configured to receive three-phase output voltages UA, UB and UC of the electric machine, and generate a first square wave signal corresponding to UA-UB, a second square wave signal corresponding to UB-UC, and a third square wave signal corresponding to UC-UA respectively. Specifically, the voltage sampling circuit of the signal conditioning circuit 201 performs voltage division and sampling on the received three-phase voltages UA, UB and UC of the generator. The high frequency noise is filtered through a capacitance filtering network to acquire Ua, Ub and Uc. Ua-Ub, Ub-Uc and Uc-Ua operations is performed through a square wave generation circuit to generate square waves SAB, SBC and SCA. Finally, the level of the square waves is matched to a voltage range acceptable for the processor 202 through a level matching circuit, and the matched square wave signals Sab, Sbc and Sca are transmitted to the processor 202. The square wave signals Sab, Sbc and Sca may be also be referred to as the first square wave signal, the second square wave signal, and the third square wave signal input to the processor 202, which correspond to the UA-UB, UB-UC and UC-UA respectively.

Figure 3:
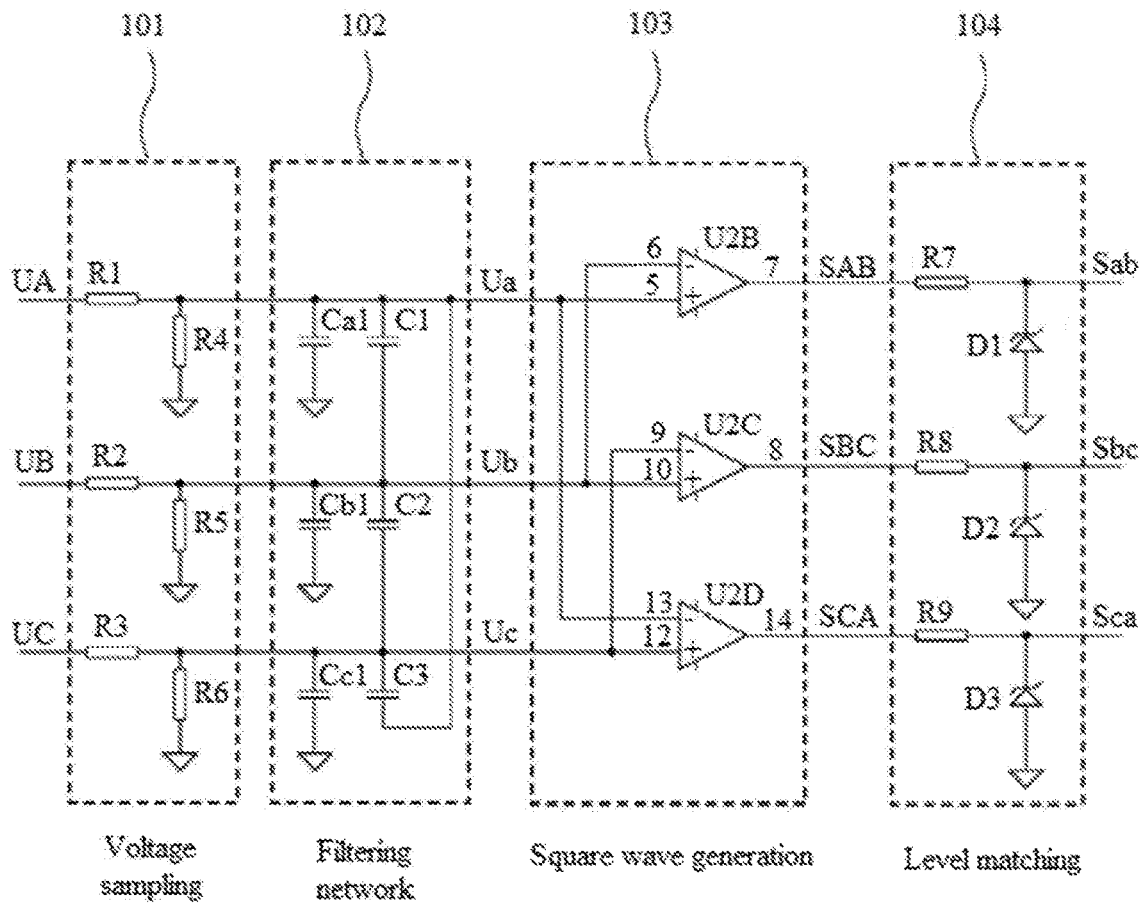
FIG. 3 is a circuit diagram showing a signal conditioning circuit of the electric machine rotation angle measurement device according to an exemplary embodiment of the present disclosure.

FIG. 3 is a circuit diagram of the signal conditioning circuit 201 of the electric machine rotation angle measurement device 200 according to an exemplary embodiment of the present disclosure.

Referring to FIG. 3, the signal conditioning circuit 201 may include a voltage sampling circuit 101, a filtering network 102, a square wave generation circuit 103 and a level matching circuit 104.

The voltage sampling circuit 101 includes six resistors R1, R2, R3, R4, R5 and R6. For each phase among the three-phase output voltages UA, UB and UC of the electric machine, two resistors are used to perform voltage division and sampling. Specifically, UA is divided and sampled by resistors R1 and R4 connected in series, UB is divided and sampled by resistors R2 and R5 connected in series, and UC is divided and sampled by resistors R3 and R6 connected in series. According to the exemplary embodiment of the present disclosure, the resistances of resistors R1, R2 and R3 are equal, the resistances of resistors R4, R5 and R6 are equal, and the resistances of R1 and R4 satisfy UA×R1/R4<=±15 v. In addition, R1 and R4 with different resistances may be flexibly selected for generators with different output voltage levels. The filtering network 102 includes capacitors Ca1, Cb1, Cc1, C1, C2 and C3. The capacitors Ca1, Cb1 and Cc1 form a star filtering network, and capacitors C1, C2 and C3 form a triangle filtering network. Therefore, the filtering network 102 may effectively filter the inter-phase interferences and the inter-line interferences, and provides pure voltage signals for operational amplifiers U2B, U2C and U2D of the subsequent stage, namely, a sinusoidal wave voltage signal Ua corresponding to the A phase voltage UA, a sinusoidal wave voltage signal Ub corresponding to the B phase voltage UB, and a sinusoidal wave voltage signal Uc corresponding to the C phase voltage UC. The capacitances of capacitors Ca1, Cb1 and Cc1 are equal, the capacitances of capacitors C1, C2 and C3 are equal, and the capacitance of Ca1 may be three times the capacitance of C1. The square wave generation circuit 103 includes three operational amplifiers U2B, U2C and U2D. Specifically, the negative input terminal of the operational amplifier U2B receives Ub, and the positive input terminal of the operational amplifier U2B receives Ua. The operational amplifier U2B outputs square wave signal SAB (namely, Ua-Ub) corresponding to UA-UB. The negative input terminal of the operational amplifier U2C receives Uc, and the positive input terminal of the operational amplifier U2C receives Ub. The operational amplifier U2C outputs square wave signal SBC (namely, Ub-Uc) corresponding to UB-UC. The negative input terminal of the operational amplifier U2D receives Ua, and the positive input terminal of the operational amplifier U2D receives Uc. The operational amplifier U2D outputs square wave signal SCA (namely, Uc-Ua) corresponding to UC-UA. The level matching circuit 104 includes three resistors R7, R8 and R9, and three Zener diodes D1, D2 and D3. The resistor R7, which is connected in serial with the Zener diode D1, receives the square wave signal SAB output by the operational amplifier U2B, and matches the level of the received square wave signal SAB to the first square wave signal Sab within a voltage range acceptable for processor 202. The resistor R8, which is connected in serial with the Zener diode D2, receives the square wave signal SBC output by the operational amplifier U2C, and matches the level of the received square wave signal SBC to the second square wave signal Sbc within a voltage range acceptable for processor 202. The resistor R9, which is connected in serial with the Zener diode D3, receives the square wave signal SCA output by the operational amplifier U2D, and matches the level of the received square wave signal SCA to the third square wave signal Sca within a voltage range acceptable for processor 202. The resistances of resistors R7, R8 and R9 are equal. The resistance of the resistor R7 satisfying: (+15V/R7) less than the current sinking capability of the Zener diode D1, which can effectively guarantee that the voltage of the signal Sab input to the 10 port of the processor 202 is limited to a secure range between −0.7V and 5V. Similarly, the voltages of the signal Sbc and Sca input to the 10 port of the processor 202 are limited to a secure range between −0.7V and 5V. Here, −0.7V to 5V is merely exemplary, and voltages of the signals Sab, Sbc, and Sca may be limited to other appropriate ranges by configuring the resistors R7, R8 and R9 and Zener diodes D1, D2 and D3 with various values according to the working requirement of the processor 202.

Further referring to FIG. 3, the signal conditioning circuit 201 execute following operations. Firstly, the voltages UA, UB and UC output by a set of windings of the electric machine are provided to the voltage sampling circuit 101, so that the high voltage is reduced to within ±15V. The attenuated voltage signals pass through the filtering network 102, so that inter-phase and inter-line high frequency interference noises of the voltage signals are filtered, to acquire the three-phase sinusoidal wave signals Ua, Ub and Uc. The square wave generation circuit 103 performs Ua-Ub operation on Ua, Ub and Uc signals to acquire a synchronous square wave signal SAB at the intersection of the waveforms of Ua and Ub, Similarly, square wave signal SBC can be acquired by Ub-Uc and square wave signal SCA can be acquired by Uc-Ua. Here, SAB, SBC and SCA are different from each other by 120 degrees in phase, and the operational amplifiers perform operation and comparison to output signals SAB, SBC and SCA with the values close to ±15V. Subsequently, they are processed by the level matching circuit 104 to acquire the signals Sab, Sbc and Sca ranging from −0.7V to 5V which can be input directly to the processor 202.

Referring back to FIG. 2, the sensor interface circuit 206 is configured to receive the zero degree reference point reset signal Zrst from sensor s (FIG. 1), and adjust the zero degree reference point reset signal Zrst to a voltage signal Srst meeting the operation requirement for processor 202.

Figure 4:
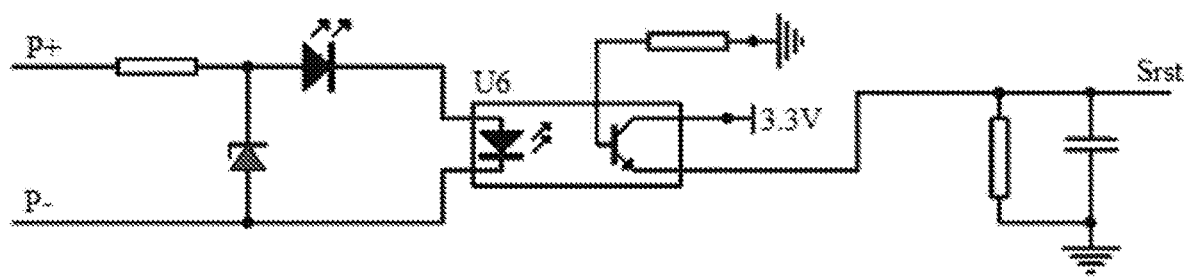
FIG. 4 is a circuit diagram showing a sensor interface circuit of the electric machine rotation angle measurement device according to an exemplary embodiment of the present disclosure.

FIG. 4 is a circuit diagram of the sensor interface circuit 206 of the electric machine rotation angle measurement device 200 according to an exemplary embodiment of the present disclosure.

Referring to FIG. 1 and FIG. 4, the zero degree reference point reset signal Zrst generated by the sensor s may be input to an input terminal P+ of the sensor interface circuit 206, the input terminal P− of the sensor interface circuit 206 may be grounded. The zero degree reference point reset signal Zrst input to the sensor interface circuit 206 passes through the optical coupling isolation U6 and then signal Srst is generated. The signal Srst is provided to the processor 202. The sensor interface circuit 206 can filter the noise in the zero degree reference point reset signal Zrst on one hand, and adjust the zero degree reference point reset signal Zrst to the voltage signal Srst meeting the operation requirement for processor 202 on the other hand.

Referring back to FIG. 2, during a rotation period of the electric machine, the processor 202 may generate a six-fold frequency pulse whenever a jump of any square wave signal among the first square wave signal, the second square wave signal, and the third square wave signal is detected, generate compensating pulses between the current six-fold frequency pulse and the next six-fold frequency pulse based on the time interval between the current six-fold frequency pulse and the previous six-fold frequency pulse and a preset compensating subdivision coefficient k, and accumulate the number of the compensating pulses. Here, the compensating subdivision coefficient k may be preset to an appropriate value according to the accuracy required by the electric machine rotation angle measurement. In addition, the processor 202 may respond to the signal Srst (namely, responding to the zero degree reference point reset signal), and clear the number of the compensating pulses. Since the zero degree reference point reset signal indicates the starting point of a rotation period of the electric machine, clearing the number of the compensating pulses at this time represents starting the measurement of the rotation angle of the electric machine in a new rotation period.

The dial switch 205, which may be connected with the processor 202, is configured to adjust the preset compensating subdivision coefficient k. Specifically, the dial switch 205 adjust the preset compensating subdivision coefficient k by changing the value of the dial switch. If the value of the dial switch 205 is dm, the compensating subdivision coefficient k equals to $2^{dm}$. The dial switch 205 will be described later in detail with reference to FIG. 5.

Figure 5:
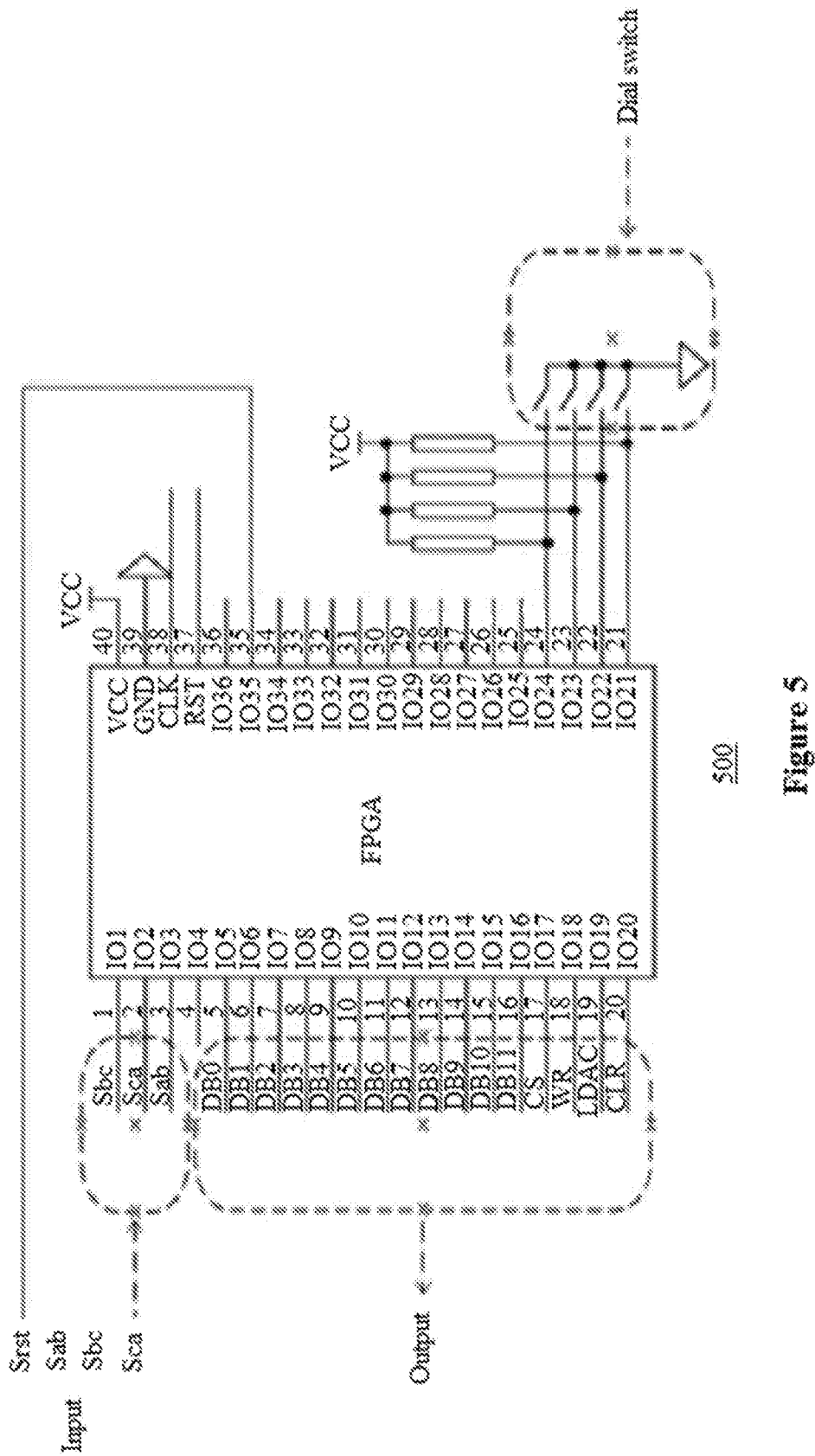
FIG. 5 shows a Field-Programmable Gate Array (FPGA) 500 of an exemplary embodiment of a processor 200 according to an exemplary embodiment of the present disclosure.

The processor 202 may be implemented by various methods of hardware or software, for example, the processor 202 may be a Field-Programmable Gate Array (FPGA) 500 shown in FIG. 5.

Referring to FIG. 5, the FPGA 500, which is an example of the processor 200, receives the signals Sab, Sbc, Sca and Srst as input signals, and outputs the number of the compensating pulses based on the dm set by the dial switch 205. The number of the compensating pulses is related to the rotation angle of the electric machine.

In FIG. 5, as an example, the value dm of the dial switch 205 may be a 4-bit binary number dm0 to dm3. One end of the dial switch 205 is connected with a ground voltage, and each bit of the other end is connected with the supply voltage VCC through a corresponding pull-up resistor. Taking the bit dm0 as an example, dm0=1 is provided to the interface 1024 of the FPGA 500 when the switch corresponding the bit dm0 is opened, and dm0=0 is provided to the interface 1024 of the FPGA 500 when the switch corresponding the bit dm0 is closed. Similarly, the bits from dm1 to dm3 are set. Therefore, the dial switch 205 provides dm0 to dm3 (namely, dm) with different values to FPGA 500 by controlling the switch of each bit. However, it is merely exemplary. The value dm of the dial switch 205 is not limited to the 4-bit binary number dm0 to dm3, but may be set to any number of bits according to requirements of the practical application and structure or performances of FPGA 500.

Referring back to FIG. 2, the calculation module 203 may receive the number of the compensating pulses from the processor 202. Whenever the number of the compensating pulses is updated, the calculation module 203 calculates the rotation angle of the electric machine based on the updated accumulated number of the compensating pulses, the preset compensating subdivision coefficient k and the number of pole pairs of the electric machine. Specifically, the calculation module 203 may calculate the rotation angle θ of the electric machine according to the following equation 1:

$$\theta = 360° \times n / P \times 6 \times k, \quad (1)$$

Here, n is the updated accumulated number of the compensating pulses, P is the number of pole pairs of the electric machine.

The calculation module 203 may be any hardware and/or software module with calculation function according to the exemplary embodiment of the present disclosure.

Referring back to FIG. 2, the DA 204 receives the number of the compensating pulses from processor 202, and acquires the voltage value Vout corresponding to the number of the compensating pulses according to following equation:

$$V\text{out} = (n/2^m) \times V\text{ref} \quad (2)$$

Here, n is the updated accumulated number of the compensating pulses, m is a quantization bit number (for example, m may be 12 bits, namely, m=12) when the number of the compensating pulses is converted to the voltage value by the DA 204, Vref is a reference voltage (for example, Vref may be 10V) for the digital to analog converter. The m in equation 2 is related to the performances of the DA 204, namely, m may have a quantization bit number corresponding to the performances of the DA 204.

Figure 6:
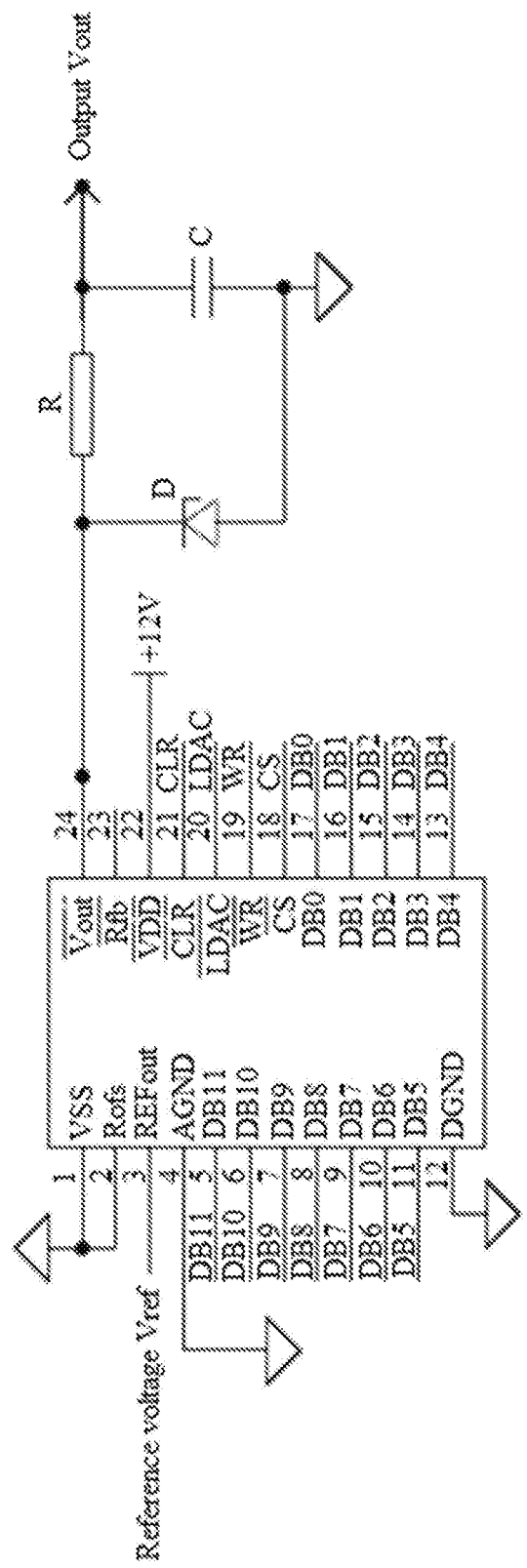
FIG. 6 is an explanatory view of the DA 204 connected with the FPGA 500 shown in FIG. 5 according to an exemplary embodiment of the present disclosure.

FIG. 6 is an explanatory view of the DA 204 connected with the FPGA 500 shown in FIG. 5 according to an exemplary embodiment of the present disclosure.

Referring to FIG. 6, the interfaces DB0 to DB11, $\overline{CS}$, $\overline{WR}$, $\overline{LDAC}$ and $\overline{CLR}$ of the DA 204 receive the outputs from the corresponding interfaces of the FPGA 500. The interface REFout of the DA 204 receives the internal reference voltage Vref. The DA 204 outputs the voltage corresponding to the number of the compensating pulses through the output interface $\overline{Vout}$, based on the reference voltage Vref and the signals received from the FPGA 500. As shown in FIG. 6, the output interface $\overline{Vout}$ is connected in series with resistor R, capacitor C and Zener diode D connected in parallel with each other, so that the voltage limiting and filtering for voltage Vout output from output interface $\overline{Vout}$ and the protection function for the DA 204 are implemented.

Although the exemplary embodiment shown in FIG. 2 shows that the electric machine rotation angle measurement device 200 may include both the calculation module 203 and the DA 204, the concepts of the present disclosure are not limited thereto. The electric machine rotation angle measurement device 200 according to the concepts of the present disclosure may include at least one of the calculation module 203 and the DA 204, according to the requirements for real engineering applications.

In an exemplary embodiment, when the electric machine rotation angle measurement device 200 includes only the DA 204, the electric machine rotation angle measurement device 200 may output only the voltage Vout related to the rotation angle of the electric machine from the DA 204. In an exemplary embodiment, the output voltage Vout may be input to a measurement and control system (not shown) provided on the outside of the electric machine rotation angle measurement device 200. The measurement and control system, on the demand of engineering applications, may calculate the rotation angle θ of the electric machine based on the voltage Vout output from the DA 204 and the following equation set (3):

$$n = 2^m \times (Vout/Vref) \quad (3)$$

$$\theta = 360° \times \frac{n}{P \times 6 \times k}$$

Here, the parameters in equation set (3) have the same meaning as the parameters in the equation 1 and equation 2 above-mentioned.

The operations of the processor 202 are described below in further detail with reference to FIG. 7 and FIG. 8.

Figure 7:
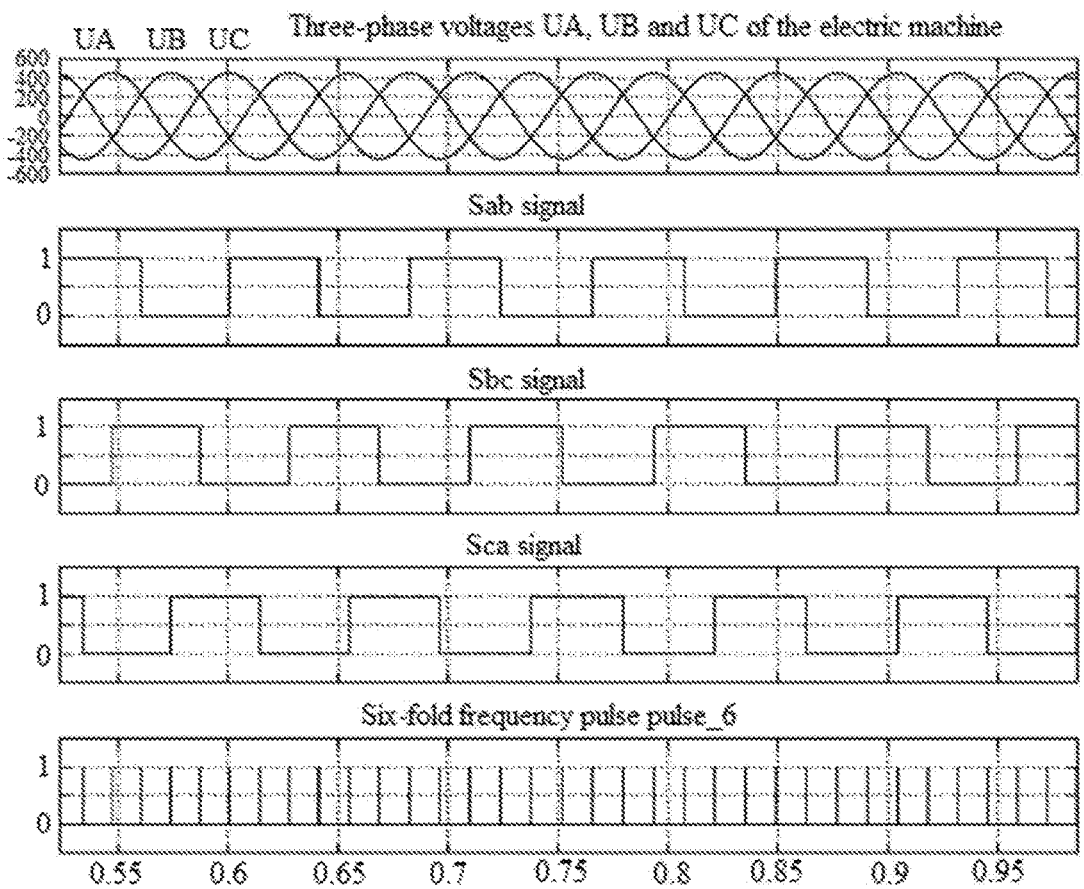
FIG. 7 is a diagram showing a six-fold frequency pulse generated by the processor according to an exemplary embodiment of the present disclosure.

FIG. 7 is a diagram showing a six-fold frequency pulse pulse_6 generated by the processor 202 of the exemplary embodiment of the present disclosure. FIG. 8 is a diagram showing a compensating pulse generated by the processor 202 of the exemplary embodiment of the present disclosure.

Referring to FIG. 7, the three-phase voltage UA, UB and UC output from the electric machine are processed by the signal conditioning circuit 201 to generate the first square wave signal to the third square wave signal Sab, Sbc and Sca. The processor 202 detects the jump of any square wave signal among the first square wave signal Sab, the second square wave signal Sbc and the third square wave signal Sca, and generates a six-fold frequency pulse pulse_6 whenever a jump is detected. Specifically, the processor 202 may sample the input first square signal Sab, perform an exclusive OR of the current sampling value with the previous sampling value, and acquire the rising and falling edge pulses of the first square wave signal Sab. Similarly, the same processes are performed on the second square wave signal Sbc and the third square wave signal Sca. Then the three-way edge signal pulses of the first square wave signal Sab, the second square wave signal Sbc and the third square wave signal Sca are combined to acquire the six-fold frequency pulse pulse_6 synchronized with the voltage output by the electric machine.

The six-fold frequency pulse (pulse_6) of the electric machine can be acquired through the operations of the processor 202 above-mentioned, based on a rotation period of the electric machine and a basic principle that the number of the voltage cycles of the three-phase winding ports of the electric machine is equal to the number of pole pairs of the electric machine. The pulse is synchronized with the rotation of the electric machine, the rotated angle of the electric machine between two six-fold frequency pulses is $$\frac{360°}{P \times 6}$$

(P is the number of pole pairs of the electric machine). Hypothetically, the number of the six-fold frequency pulses accumulated by the processor 202 is $n_0$ during a rotation period of the electric machine, the rotated angle θ of the electric machine relative to the zero degree reference point is $$\theta = 360° \times \frac{n_0}{P \times 6}.$$

However, the ration angle acquired by accumulating only the number of the six-fold frequency pulses is not precise enough. A subdivision pulse is generated between adjacent six-fold frequency pulses for further improvement of the precision and response performance for measuring the electric machine rotation angle, as shown in FIG. 8.

Figure 8:
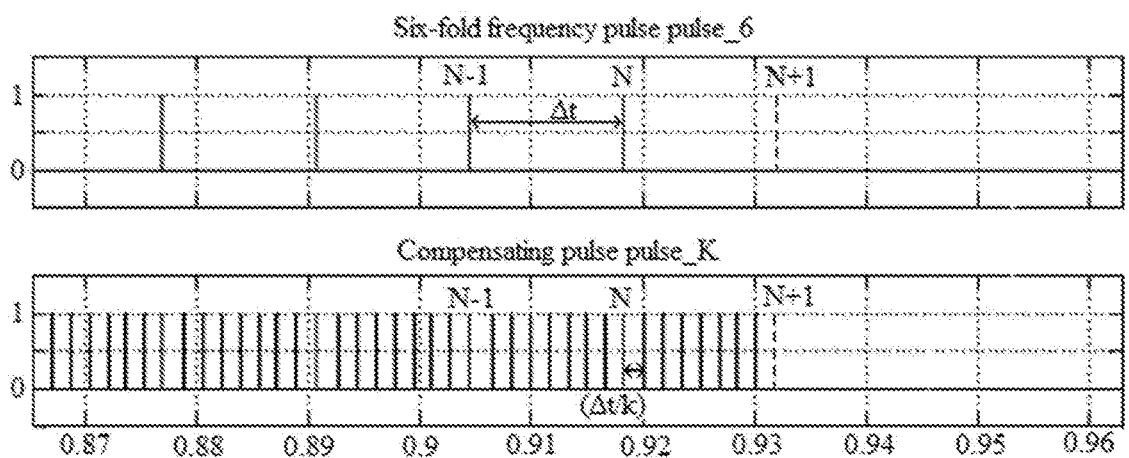
FIG. 8 is a diagram showing a compensating pulse generated by the processor according to an exemplary embodiment of the present disclosure.

Referring to FIG. 8, the currently generated six-fold frequency pulse pulse_6 may be referred to as the current six-fold frequency pulse N, the previous six-fold frequency pulse pulse_6 of the current six-fold frequency pulse N may be referred to as previous six-fold frequency pulse N−1, the subsequent six-fold frequency pulse pulse_6 of the current six-fold frequency pulse N may be referred to as next six-fold frequency pulse N+1.

During a rotation period, the time interval Δt between the current six-fold frequency pulse N and the previous six-fold frequency pulse N−1 may be calculated by the processor 202, and the time interval Δt is divided by the compensating subdivision coefficient k to acquire a specific interval Δt/k. Then, the processor 202 may sequentially generate k−1 compensating pulses (pulse_k) at the specific time interval Δt/k, after the current six-fold frequency pulse N, sequentially accumulate the number of the compensating pulses, and then, output the number of the compensating pulses to at least one of the calculation module 203 and the DA 204 to calculate the electric machine rotation angle and/or the voltage value corresponding to the number of the compensating pulses. In other words, the processor 202 may generate k−1 compensating pulses between the current six-fold frequency pulse and the next six-fold frequency pulse based on the time interval between the current six-fold frequency pulse and the previous six-fold frequency pulse and the compensating subdivision coefficient k, and update the accumulated number of the compensating pulses whenever a compensating pulse is generated. After the processor 202 generates k−1 compensating pulses, it waits for the arrival of the next six-fold frequency pulse N+1. When the processor 202 detects the arrival of the next six-fold frequency pulse N+1, it takes the next six-fold frequency pulse N+1 also as a compensating pulse, and accumulates the number of the compensating pulses.

In addition, when the processor 202 detects the next six-fold frequency pulse N+1, the processor 202 records the moment when the next six-fold frequency pulse N+1 arrives to calculate the time interval between the next six-fold frequency pulse N+1 and the current six-fold frequency pulse N, so as to generate k−1 compensating pulses between the next six-fold frequency pulse N+1 and the subsequent six-fold frequency pulse N+2.

According to the exemplary embodiment of the present disclosure, the generation of the compensating pulse between the current six-fold frequency pulse and the next six-fold frequency pulse is based on the time interval between the current six-fold frequency pulse and the previous six-fold frequency pulse. Therefore, the processor 202 records the moment when each six-fold frequency pulse is generated and the time interval between six-fold frequency pulses. And the last time interval recorded during the previous cycle period of the electric machine may be used for the generation of the initial compensating pulse of the next cycle period.

In general, whenever a jump of any square wave signal among a first square signal, a second square wave signal, and a third square wave signal is detected by the processor 202 during a rotation period of the electric machine, a six-fold frequency pulse is generated, a compensating pulse is generated between the current six-fold frequency pulse and the next six-fold frequency pulse based on the time interval between the current six-fold frequency pulse and the previous six-fold frequency pulse and the preset compensating subdivision coefficient k, and the number of the compensating pulses is accumulated. The processor acquires the specific interval by dividing the time interval between the current six-fold frequency pulse and the previous six-fold frequency pulse by the preset compensating subdivision coefficient k. Before the next six-fold frequency pulse is detected, the processor 202 generates compensating pulses at the specific interval, and accumulates the number of the compensating pulse until k−1 compensating pulses are generated. When the next six-fold frequency pulse is detected, the next six-fold frequency pulse is taken as a compensating pulse, and the number of the compensating pulses is accumulated.

During the initial phase of the electric machine rotation, since the rotating speed of the electric machine is slower, it may not be necessary to generate the compensating pulse, and the desired rotation angle of the electric machine can be obtained by simply accumulating the six-fold frequency pulses. In an exemplary embodiment, a preset value may be set in advance according the technical requirement and engineering practice for rotation angle measurement. When the rotation speed of the electric machine is less than the preset value, the processor 202 does not generate any compensating pulse, and takes the six-fold frequency pulse as the compensating pulse. This may be done by adjusting the value of the dial switch to 0. In this case, the flexibility of the electric machine rotation angle measurement device may be increased and the resource consumption may be saved.

The rotation angle of the electric machine changes from 0 to 360 degrees during a rotation period of the electric machine, so the measurement of the rotation angle of the electric machine by the processor 202 is performed for each rotational period. When the zero degree reference point reset signal (for example, a rising edge) corresponding to the starting point of a rotation period of the electric machine is detected by the processor 202, the processor 202 clears and resets the number of the compensating pulses to restart the calculation of the number of the compensating pulses during the next new rotation period.

Therefore, the accumulation for the number of the compensating pulses by the processor 202 occurs in a cycle period, that is, the accumulation for the number of the compensating pulses starts from the moment when the zero degree reference point reset signal of the current cycle period is received. It lasts until the next zero degree reference point reset signal is received by the processor 202, which indicates the end of the current cycle period. Then the number of the compensating pulses is cleared to re-generate and accumulate the number of the compensating pulses during the next cycle period.

In addition, during a cycle period, whenever a compensating pulse is generated by the processor 202 (or a six-fold frequency pulse is detected), the number of the compensating pulses is updated. Accordingly, the electric machine rotation angle corresponding to the updated number of the compensating pulses is calculated by the calculation module 203. Alternatively, the voltage value corresponding to the updated number of the compensating pulses is acquired by the DA 204.

In an example, the electric machine shown in FIG. 1 is a wind turbine generator. Further, the wind turbine is a direct-driven wind turbine, and the calculated electric machine rotation angle is the rotation angle of the wheel.

Figure 9:
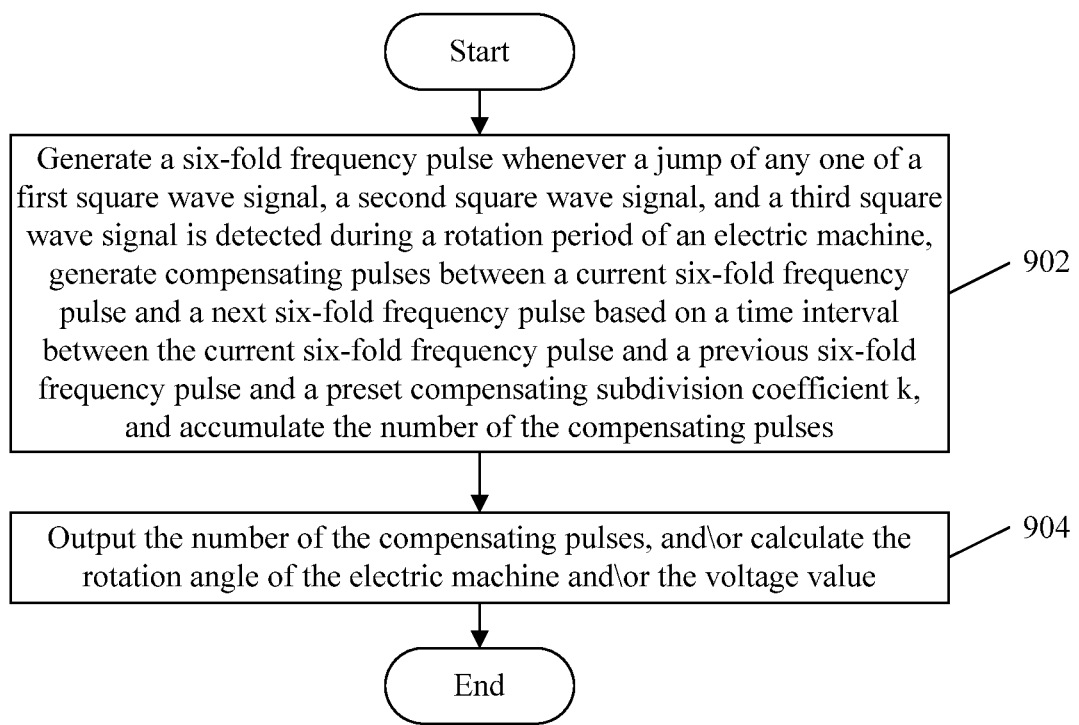
FIG. 9 is a flowchart showing an electric machine rotation angle measurement method according to an exemplary embodiment of the present disclosure.

FIG. 9 is a flowchart of an electric machine rotation angle measurement method according to an exemplary embodiment of the present disclosure.

Reference is made to FIG. 9. In step 902, a six-fold frequency pulse is generated, whenever a jump of any square wave signal among the first square wave signal, the second square wave signal, and the third square wave signal is detected, during a rotational period of the electric machine. Compensating pulses are generated between the current six-fold frequency pulse and the next six-fold frequency pulse based on the time interval of the current six-fold frequency pulse and the previous six-fold frequency pulse and the preset compensating subdivision coefficient k, and the number of the compensating pulses is accumulated. The first square wave signal corresponds to a difference UA-UB between UA and UB among three-phase output voltages UA, UB and UC of the electric machine, the second square wave signal corresponds to a difference UB-UC between UB and UC among three-phase output voltages UA, UB and UC of the electric machine, and the third square wave signal corresponds to a difference UC-UA between UC and UA among three-phase output voltages UA, UB and UC of the electric machine. In addition, the first square wave signal, the second square wave signal, and the third square wave signal may be generated according to the operations of the signal conditioning circuit 201 described in FIG. 3, and the detailed description will be omitted herein for clarity and conciseness.

The method for generating the compensating pulses in step 902 will be described later in further detail in connection with FIG. 10.

In step 904, whenever the number of the compensating pulses is updated, it may output the number of the compensating pulses directly, and\or calculate the rotation angle of the electric machine, and\or calculate the voltage value, according to the requirement of engineering application.

In step 904, the step for calculating the rotation angle of the electric machine may include: whenever the number of the compensating pulses is updated, calculating the rotation angle of the electric machine based on the updated accumulated number of the compensating pulses, the preset compensating subdivision coefficient k and the number of pole pairs of the electric machine.

Specifically, the rotation angle θ of the electric machine is calculated according to an equation $$\theta = 360° \times \frac{n}{P \times 6 \times k},$$

where n is the updated accumulated number of the compensating pulses, and P is the number of pole pairs of the electric machine.

In step 904, the corresponding voltage value may be calculated. The step for calculating the corresponding voltage value may include: transmitting the accumulated number of the compensating pulses to a digital to analog converter so that the digital to analog converter acquires the voltage value Vout corresponding to the number of the compensating pulses according to the equation Vout=(n/$2^m$)×Vref, where, n is the updated accumulated number of the compensating pulses, m is the quantization bit number when the number of the compensating pulses is converted to the voltage value by the digital to analog converter, and Vref is a reference voltage for the digital to analog converter.

The method for generating the compensating pulses in step 902 is described below in detail.

In step 902, measuring the rotation angle of the electric machine may include two main stages:

The first stage is an initial stage of the power-on rotation of the electric machine. At this stage, the electric machine rotates in a lower speed and is unsteadily, and it is not necessary to measure the precise rotation angle of the electric machine. Therefore, the value dm of the dial switch may be set to 0 when the rotation speed of the electric machine is less than a preset value. Thus, the compensating coefficient k=$2^{dm}$=$2^0$=1, that is, no compensating pulse is generated, and instead, the six-fold frequency pulses are taken as the compensating pulses. At this stage, the time interval Δt between adjacent successive six-fold frequency pulses may be recoded so that it can be used when compensation pulses need to be generated at a later stage.

In the second stage, the rotation speed tends to be steady after the electric machine rotates for a period of time. The precise rotation angle of the electric machine is to be measured at this stage. The value dm of the dial switch may be preset to the appropriate value according to the required accuracy. And, the preset compensating coefficient k=$2^{dm}$ can be calculated.

Taking a rotational period of the electric machine as an example, the measurement of the rotation angle of the electric machine in the second stage above-mentioned may include two cases.

For the first case, the number n of the compensating pulses is initialized (namely, n is cleared to zero: n=0) at the beginning of a rotational period of the electric machine, namely, when the electric machine rotates to the zero degree reference point (the zero degree reset signal is triggered, for example, a rising edge of the zero degree reset signal is detected). Then, k−1 compensating pulses are generated one by one based on Δt acquired in the previous rotational period. And, the number n of the compensating pulses is accumulated.

For the second case, k−1 compensating pulses are generated between any current six-fold frequency pulse and the next six-fold frequency pulse during a rotational period of the electric machine. And the number n is accumulated.

Figure 10:
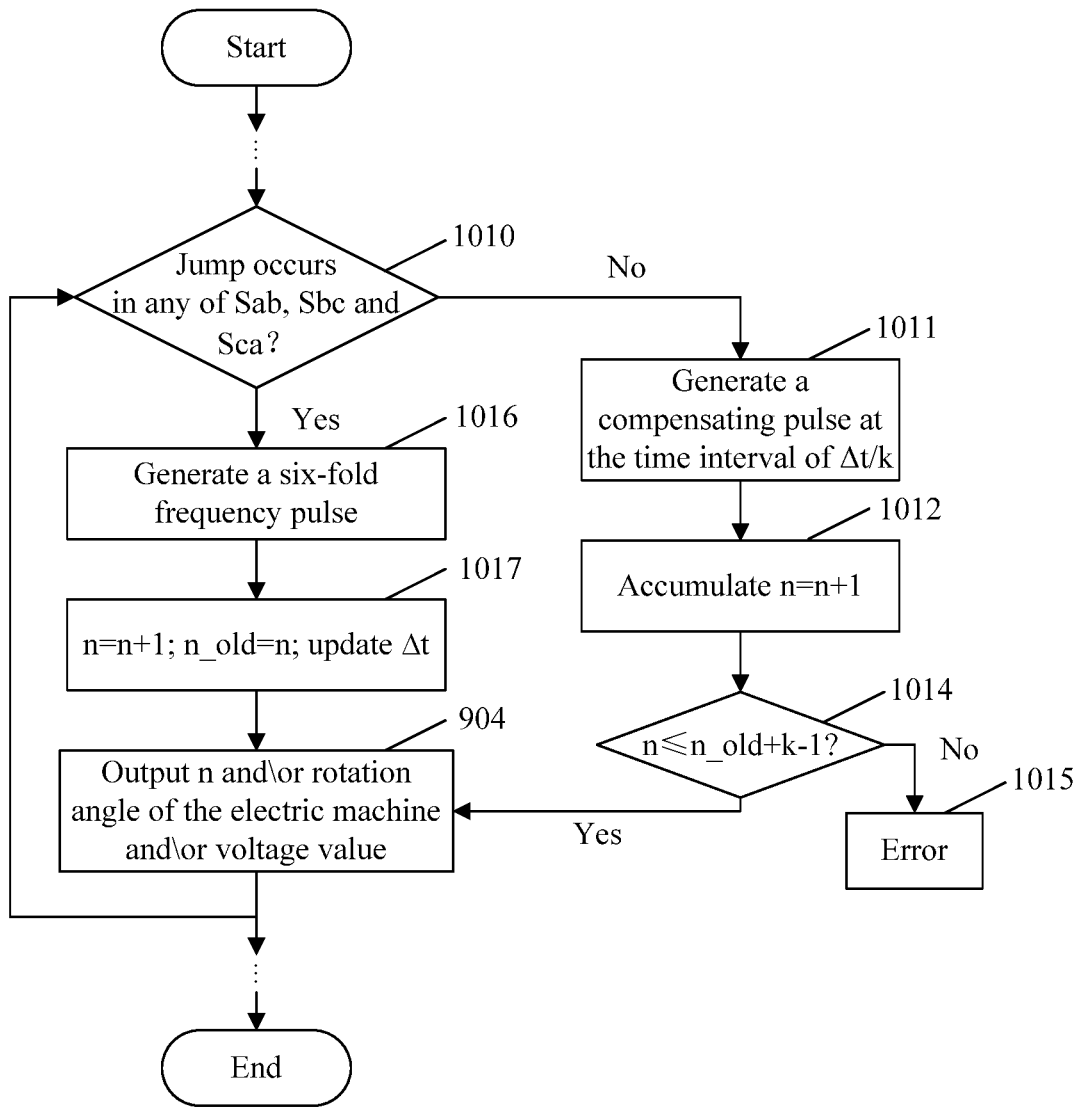
FIG. 10 is a flowchart showing a method for generating the compensating pulse according to an exemplary embodiment of the present disclosure.

FIG. 10 is a flowchart of the method for generating the compensating pulses according to an exemplary embodiment of the present disclosure. In FIG. 10, for the convenience of description, only an example of the method for generating the compensating pulses between the current six-fold frequency pulse and the next six-fold frequency pulse in the second cases above-mentioned is shown.

In step 1010, it is detected whether a jump occurs in any of the Sab, Sbc and Sca.

When no jump is detected in step 1010, namely, the next six-fold frequency pulse is not detected, the specific interval Δt/k may be acquired by dividing the time interval Δt between the current six-fold frequency pulse and the previous six-fold frequency pulse by the preset compensating subdivision coefficient k, and a compensating pulse is generated at the time interval of Δt/k, in step 1011.

In step 1012, the number n of the compensating pulses is accumulated.

In step 1014, it is determined whether the number of the compensating pulses generated between the current six-fold frequency pulse and the next six-fold frequency pulse is less than or equal to k−1. Here, n_old is an intermediate variable for implementing the determination.

If it is determined, in the step 1014, that "the number of the compensating pulses is less than k−1", namely "yes", the number n of the compensating pulses accumulated in step 1012 may be output directly, and\or the rotation angle of the electric machine may be calculated, and\or the voltage value may be calculated, based on the accumulated number n of the compensating pulses in step 1012, in step 904 (namely, step 904 shown in FIG. 9). Then, it proceeds to step 1010, to continue to detect the jump. Compensating pulses continue to be generated if no jump is detected, until k−1 compensating pulses are generated. If the determination at step 1014 is "no", namely, the number of the generated compensating pulses is greater than k−1, an error signal may be generated in step 1015.

When the jump is detected in step 1010, a six-fold frequency pulse is generated (namely, the next six-fold frequency pulse is detected) in step 1016. In step 1017, the next six-fold frequency pulse is taken as the compensating pulse. The number n of the compensating pulses is accumulated, and n_old=n is made. Δt is updated at the same time. In step 904, it may output the number of the compensating pulses directly, and\or calculate the rotation angle of the electric machine, and\or calculate the voltage value based on the accumulated n in step 1017.

FIG. 9 and FIG. 10 merely show the method for measuring the rotation angle of the electric machine and the exemplary embodiment for generating the compensating pulses, but the concept of the present disclosure is not limited to the above-mentioned steps. For example, according to the exemplary embodiment of the present disclosure, the electric machine rotation angle measurement method may further include: ending the measurement for the rotation angle of the electric machine directly when the electric machine is powered off, or changing the compensating subdivision coefficient k by the dial switch 205 to continue measuring the rotation angle of the electric machine.

In an exemplary embodiment, the electric machine above-mentioned is a wind turbine generator. Further, the wind turbine is a direct-driven wind turbine. The electric machine rotation angle, acquire by the method shown in FIG. 9, is the rotation angle of the wheel.

The electric machine rotation angle measurement method, according to the exemplary embodiment of the present disclosure, may be implemented as computer readable codes on a computer readable recording medium, or may be transmitted via a transmission medium. The computer readable recording medium is any data storage device that is able to store data, which may thereafter be read by the computer system. Examples of the computer readable recording medium may include but not limited to a read-only memory (ROM), a random access memory (RAM), a compact disk (CD)-ROM, a digital versatile disc (DVD), a magnetic tape, a floppy disc and an optical data storage device. The transmission medium may include carriers transmitted via the network or various communication channels. The computer readable recording medium may also be distributed over a computer system connected to the network so that the computer readable codes are stored and executed in a distributed fashion.

In addition, the electric machine rotation angle measurement method, according to the exemplary embodiment of the present disclosure, may be implemented by using the computer system. The computer system may include the computer readable medium above-mentioned.

According to the electric machine rotation angle measurement device and method of the exemplary embodiment of the present disclosure, mechanisms or structures are not required to transfer the rotation of the electric machine to the electric machine rotation angle measurement device as compared with the conventional contact and non-contact type electric machine rotation angle measuring methods. The jitter and impact generated by the low-speed operation of the electric machine do not affect the measurement effect and the measurement life according to the present disclosure. A special modem is not required by the electric machine rotation angle measurement device, so that the cost may be reduced.

On the other hand, the electromagnetic interference generated by the operation of the electric machine does not affect the electric machine rotation angle measurement device according to the present disclosure, so that it has stronger anti-interfere performance and higher accuracy.

In the present disclosure, the DA may be utilized to calculate the voltage corresponding to the rotation angle of the electric machine, and directly output the voltage corresponding to the rotation angle of the electric machine to the subsequent measurement and control system for the corresponding application of engineering. A special SSI interface and device is not required, the cost is low and response speed is fast.

In the present disclosure, the compensating pulses may be generated based on the compensating subdivision coefficient k, and the rotation angle of the electric machine may be calculated based on the number of the compensating pulses, the compensating subdivision coefficient k and the number of pole pairs of the electric machine. The accuracy of the electric machine rotation angle measured according to the present disclosure is higher than the measurement accuracy achieved by installing a tooth profile disc on the electric machine or using multiple mechanical structural feature detection points on the circumference of the rotation component of the electric machine. In addition, the utility of the compensating pulse may implement the subdivision of the rotation angle of the electric machine between adjacent six-fold frequency pulses, which reduces the error in the measurement, increase the accuracy and timeliness of the measurement, and has no large phase difference with the real ration angle.

Therefore, the electric machine rotation angle measurement device according to the present disclosure can improve the precision, the reliability and the stability for measuring the rotation angle of the electric machine, and a special modem is not required to reduce the cost.

Operations for the modules of the electric machine rotation angle measurement device shown in FIG. 1 to FIG. 8, according to the exemplary embodiment of the concept of the present disclosure, and the electric machine rotation angle measurement method shown in FIG. 9 and FIG. 10 may be written as a program or a software. The program or the software may be written using any programming language, based on block diagrams and flowcharts shown in drawings and the corresponding description in the specification. In an example, the program or the software may include machine codes that can be directly executed by one or more processors or the computer, such as machine codes produced by a compiler. In another example, the program or the software may include higher level codes that can be executed by one or more processors or the computer using an interpreter. The program or the software may be recorded, stored or fixed on one or more non-transitory computer-readable storage media. In an example, the program, or the software, or one or more non-transitory computer-readable storage media may be distributed on the computer system.

Although the specific exemplary embodiments of the present disclosure are described above in detail, with reference from FIG. 1 to FIG. 10, various modifications may be made to the inventive without deviation from the spirit and scope of the concept of the present disclosure. Therefore, the scope of the present disclosure should be determined not only based on the exemplary embodiments described above, but also based on the claims and equivalents.

The invention claimed is:

1. An electric machine rotation angle measurement device, comprising:
   a signal conditioning circuit, configured to receive three-phase output voltages UA, UB and UC of an electric machine, and generate a first square wave signal corresponding to UA-UB, a second square wave signal corresponding to UB-UC, and a third square wave signal corresponding to UC-UA respectively; and
   a processor, configured to generate a six-fold frequency pulse whenever a jump of any one of the first square wave signal, the second square wave signal, and the third square wave signal is detected during a rotation period of the electric machine, generate compensating pulses between a current six-fold frequency pulse and a next six-fold frequency pulse based on a time interval between the current six-fold frequency pulse and a previous six-fold frequency pulse and a preset compensating subdivision coefficient k, and accumulate a number of the compensating pulses, wherein the number of the compensating pulses is related to a rotation angle of the electric machine.

2. The electric machine rotation angle measurement device according to claim 1, further comprising:
   a calculation module, configured to, whenever the number of the compensating pulses is updated, calculate the rotation angle of the electric machine, based on the updated accumulated number of the compensating pulses, the preset compensating subdivision coefficient k and a number of pole pairs of the electric machine.

3. The electric machine rotation angle measurement device according to claim 1, wherein:
the processor is configured to acquire a specific interval by dividing the time interval between the current six-fold frequency pulse and the previous six-fold frequency pulse by the preset compensating subdivision coefficient k; and
the processor is configured to, before the next six-fold frequency pulse is detected, generate the compensating pulses with the specific interval and accumulate the number of the compensating pulses until k−1 compensating pulses are generated, and when the next six-fold frequency pulse is detected, take the next six-fold frequency pulse as a compensating pulse, and accumulate the number of the compensating pulses.

4. The electric machine rotation angle measurement device according to claim 1, further comprising:
a dial switch, configured to adjust the preset compensating subdivision coefficient k,
wherein, the dial switch is configured to adjust the preset compensating subdivision coefficient k by changing a value of the dial switch,
wherein, if the value of the dial switch is dm, the preset compensating subdivision coefficient k equals to $2^{dm}$.

5. The electric machine rotation angle measurement device according to claim 2, wherein, the calculation module is configured to calculate the rotation angle θ of the electric machine according to the following equation:

$$\theta = 360° \times \frac{n}{P \times 6 \times k},$$

wherein, n is the updated accumulated number of the compensating pulses, and P is the number of the pole pairs of the electric machine.

6. The electric machine rotation angle measurement device according to claim 1, wherein:
a zero degree reference point is provided on the electric machine,
the zero degree reference point indicates a starting point of a rotation period of the electric machine,
when the zero degree reference point comes close to a sensor provided on an outside of the electric machine rotation angle measurement device, the sensor generates a zero degree reference point reset signal,
the processor is configured to clear the number of the compensating pulses in responses to the zero degree reference point reset signal.

7. The electric machine rotation angle measurement device according to claim 6, further comprising:
a sensor interface, configured to receive the zero degree reference point reset signal from the sensor, and adjust the zero degree reference point reset signal to a voltage signal which meets operation requirement of the processor.

8. The electric machine rotation angle measurement device according to claim 1, wherein, the processor is configured to take the six-fold frequency pulse as the compensating pulse, without generating the compensating pulse, when a rotation speed of the electric machine is less than a preset value.

9. The electric machine rotation angle measurement device according to claim 1, wherein, the electric machine is a wind turbine generator.

10. An electric machine rotation angle measurement method, comprising:
generating a six-fold frequency pulse whenever a jump of any one of a first square wave signal, a second square wave signal, and a third square wave signal is detected during a rotation period of an electric machine,
generating compensating pulses between a current six-fold frequency pulse and a next six-fold frequency pulse based on a time interval between the current six-fold frequency pulse and a previous six-fold frequency pulse and a preset compensating subdivision coefficient k, and
accumulating a number of the compensating pulses, the number of the compensating pulses being related to a rotation angle of the electric machine,
wherein, the first square wave signal corresponds to a difference UA-UB between UA and UB among three-phase output voltages UA, UB and UC of the electric machine, the second square wave signal corresponds to a difference UB-UC between UB and UC among the three-phase output voltages UA, UB and UC of the electric machine, and the third square wave signal corresponds to a difference UC-UA between UC and UA among the three-phase output voltages UA, UB and UC of the electric machine.

11. The electric machine rotation angle measurement method according to claim 10, further comprising:
whenever the number of the compensating pulses is updated, calculating the rotation angle of the electric machine, based on the updated accumulated number of the compensating pulses, the preset compensating subdivision coefficient k and a number of pole pairs of the electric machine.

12. The electric machine rotation angle measurement method according to claim 10, wherein, generating compensating pulses between the current six-fold frequency pulse and the next six-fold frequency pulse and accumulating the number of the compensating pulse comprises:
acquiring a specific interval by dividing the time interval between the current six-fold frequency pulse and the previous six-fold frequency pulse by the preset compensating subdivision coefficient k;
generating the compensating pulses with the specific interval and accumulating the number of the compensating pulses until k−1 compensating pulses are generated, before the next six-fold frequency pulse is detected;
taking the next six-fold frequency pulse as a compensating pulse and accumulating the number of the compensating pulses, when the next six-fold frequency pulse is detected.

13. The electric machine rotation angle measurement method according to claim 10, further comprises:
receiving the preset compensating subdivision coefficient k adjusted by a dial switch, wherein if a value of the dial switch is dm, the preset compensating subdivision coefficient k equals to $2^{dm}$.

14. The electric machine rotation angle measurement method according to claim 11, wherein, calculating the rotation angle of the electric machine comprises:
calculating the rotation angle θ of the electric machine according to the following equation:

$$\theta = 360° \times \frac{n}{P \times 6 \times k},$$

wherein, n is the updated accumulated number of the compensating pulses, and P is the number of the pole pairs of the electric machine.

15. The electric machine rotation angle measurement method according to claim 10, wherein:
a zero degree reference point is provided on the electric machine, and the zero degree reference point indicates a starting point of a rotation period of the electric machine, and
the electric machine rotation angle measurement method further comprises:
clearing the number of the compensating pulses when the electric machine rotates to the zero degree reference point.

16. The electric machine rotation angle measurement method according to claim 10, further comprising:
taking the six-fold frequency pulse as the compensating pulse, without generating the compensating pulse, when a rotation speed of the electric machine is less than a preset value.

17. The electric machine rotation angle measurement method according to claim 10, wherein, the electric machine is a wind turbine generator.

18. A computer-readable storage medium, wherein, the computer-readable storage medium stores a program, and the program executes the method according to claim 10.

19. A computer system, wherein, the computer system comprises a readable storage medium storing a computer program, and the computer program executes the method according to claim 10.

* * * * *